United States Patent [19]

Nagai et al.

[11] Patent Number: 5,806,897
[45] Date of Patent: Sep. 15, 1998

[54] MECHANISM FOR ATTACHING A FLUID-RELATED DEVICE TO A DEVICE-ATTACHING FRAME MEMBER

[75] Inventors: Shigekazu Nagai; Koji Sugano, both of Ibaraki, Japan

[73] Assignee: SMC Corporation, Tokyo, Japan

[21] Appl. No.: 715,906

[22] Filed: Sep. 19, 1996

[30] Foreign Application Priority Data

Oct. 3, 1995 [JP] Japan ................................ 7-279678
Oct. 3, 1995 [JP] Japan ................................ 7-279679

[51] Int. Cl.$^6$ ............................................. F16L 55/00
[52] U.S. Cl. ........................ 285/86; 285/125.1; 285/360
[58] Field of Search .................... 285/86, 125.1, 285/360, 376, 401

[56] References Cited

U.S. PATENT DOCUMENTS

| | | | |
|---|---|---|---|
| 1,011,284 | 12/1911 | Utz et al. ............................ | 285/376 X |
| 1,253,065 | 1/1918 | Looze ................................ | 285/360 X |
| 2,050,647 | 8/1936 | Corta ................................ | 285/376 X |
| 2,823,699 | 2/1958 | Willis ................................ | 285/376 X |
| 3,370,144 | 2/1968 | Arthur et al. ........................ | 285/376 X |
| 3,468,565 | 9/1969 | Roder ................................ | 285/360 X |
| 3,480,300 | 11/1969 | Jeffery et al. ........................ | 285/376 X |
| 4,695,047 | 9/1987 | Ehrhardt et al. . | |

FOREIGN PATENT DOCUMENTS

| | | |
|---|---|---|
| 7-27113 | 1/1995 | Japan . |
| WO 95/02128 | 1/1995 | WIPO . |

Primary Examiner—Dave W. Arola
Attorney, Agent, or Firm—Oblon, Spivak, McClelland, Maier & Neustadt, P.C.

[57] ABSTRACT

Fitting grooves in a frame member 1 are formed so as to create approximately T-shaped cross section with a small opening width, and a connection hole is formed in the bottom of the fitting groove. An attachment section of a fluid-related device has a locking section 20 with a horizontal width less than and a length greater than the width of the opening of the fitting groove, and a seal member that seals the circumference of the connection hole. The Locking section 20 can be attached to and removed from the opening of the fitting groove by inserting it into the fitting groove and rotating it through 90°.

4 Claims, 11 Drawing Sheets

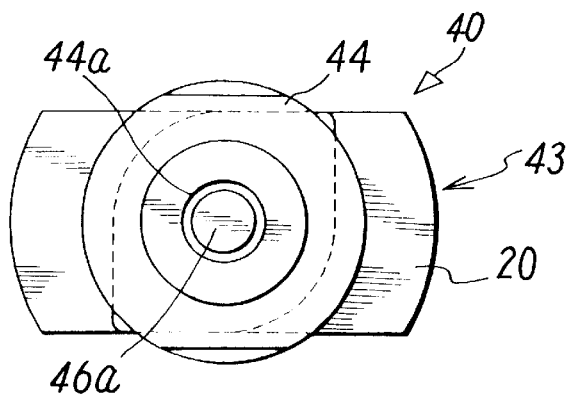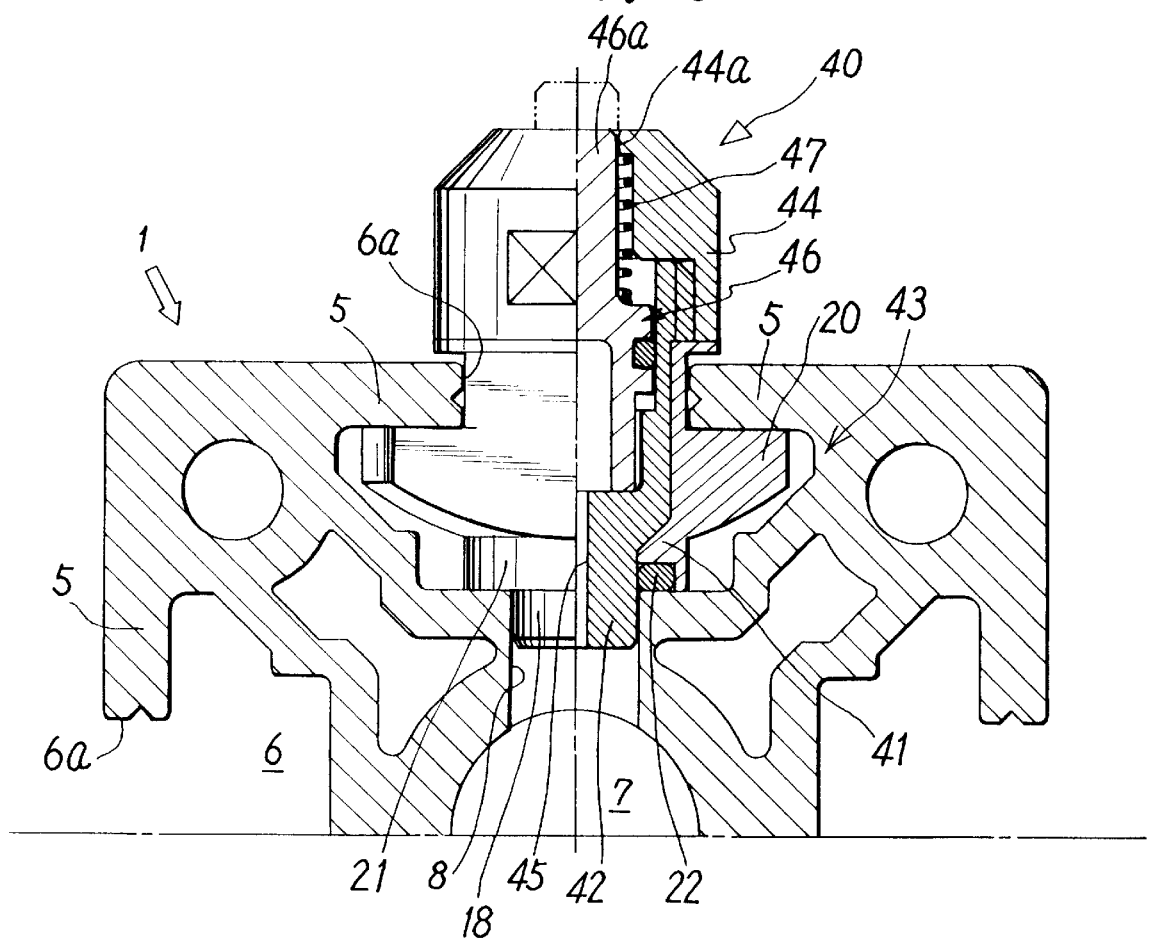

MECHANISM FOR ATTACHING A FLUID-RELATED DEVICE TO A DEVICE-ATTACHING FRAME MEMBER

BACKGROUND OF THE INVENTION

1. Field of the Invention

The present invention relates to a fluid-related-device attachment mechanism that can easily attach and remove a fluid-related device such as a pipe joint for connecting pipes, a fluid hole joint for connecting fluid holes in two frame members, a plug for blocking the fluid hole, or a pressure detector to and from a frame member acting both as an attachment member to which various fluid or electrical devices such as solenoid valves, cylinders, or their controllers are attached and as a conduit for leading a pressurized fluid such as compressed air.

2. Description of Prior Art

Those mechanisms which attach various fluid or electrical devices to a frame member including fitting grooves into which such devices are fitted and fluid holes for leading a pressurized fluid such as compressed air, and which also attach a pipe joint to the frame member and use it to connect the fluid holes in frame members and to supply the pressurized fluid to the device through a tube connected to the pipe joint, are publicly known as disclosed in, for example, Japanese Patent Application Laid Open No. H 7-27113.

To attach the pipe joint to the frame member, the pipe joint is conventionally fit in a connection hole formed in the frame member, or if the connection hole is opened at the bottom of the fitting groove, a flange attachment section formed on the pipe joint is contacted with the frame member so that the attachment section extends across the fitting groove, and then the attachment section is fixed to the frame member using screws.

The installation of pipe joints has thus been relatively cumbersome, and the machining and handling of parts have been burdensome due to the need to machine screw holes and to prepare a plurality of screws.

In addition, when unwanted connections holes are blocked with plugs to remove the device or to change its attached position, or when a pressure detector for detecting the flow of a pressurized fluid through the fluid hole is mounted in the hole, the plugs or detector have had to be installed in the same manner as in the pipe joint, and this installation procedure has been cumbersome.

BRIEF SUMMARY OF THE INVENTION

A main objective of this invention is to provide a fluid-related-device attachment mechanism that can use device fitting grooves to simply and quickly attach and remove fluid-related devices such as joints, plugs, and pressure detectors to and from a frame member acting as both an attachment member to which various devices are attached and as a conduit.

Another objective of this invention is to provide a fluid-related-device attachment mechanism that can reliably attach fluid-related devices to a frame member so that the devices will not be removed by vibrations or impact.

According to this invention, to achieve the above objectives, the fitting groove in the frame member has an approximately T-shaped cross section with a small opening width and has in its bottom a connection hole leading to a fluid hole; and the attachment section of a fluid-related device has a locking section with a horizontal width smaller and a length larger than the width of the opening of the fitting groove and a seal member for sealing the circumference of the connection hole. When the locking section is inserted into the fitting groove and the fluid-related device is rotated through a specified angle, the locking section is engaged with the opening of the fitting groove, and the seal member is pressed against the bottom of the groove to seal the circumference of the connection hole. The device is thus firmly attached to the frame member.

Thus, according to this invention, by simply inserting the attachment section into the fitting groove and rotating the fluid-related device clockwise or counterclockwise through a specified angle, the device can be simply attached to or removed from the frame member, so the attachment and removal operations are simple and quick compared to conventional methods using screws. In addition, since the device-fitting groove can also be used to install the fluid-related device, special machining such as the machining of connection holes to make screw holes and the cutting of a plurality of threads is not required, the machining of the frame member is easily performed, and the number of required parts is small.

According to a specific embodiment of this invention, the attachment section of the fluid-related device has a first portion to be located between a pair of opening edges that regulate the width of the opening of the fitting groove and, using the opening edges to limit the rotation angle of the fluid-related device to 90°, a second portion having a locking section that rotates through 90° within the fitting groove to be engaged with the opening edges and a seal member that is pressed against the bottom of the groove to seal the circumference of the connection hole when the locking section is engaged with the opening edges, and a third cylindrical portion that is fitted into the connection hole.

According to this invention, the locking section of the fluid-related device has on at least half of the surface in the horizontal width direction which contacts the opening edges of the fitting groove, a portion that gradually inclines outward in the direction away from the opening edges. This prevents the end of the contacting surface from being caught by the opening edges when the fluid-related device is rotated to contact and engage the inner surface of the opening edges.

According to this invention, the fluid-related device has a lock means that attaches and locks the device to the frame member. The lock means may comprise, for example, an outer casing mounted on the outer circumference of the body of the fluid-related device in such a way that the casing can move in the direction of the axis of the body but is fixed in its rotating direction, at least one protrusion formed at the proximal end of the outer casing and having an exact width that enables the protrusion to be fitted in the opening of the fitting groove, and a spring for pressing the outer casing toward the proximal end.

BRIEF DESCRIPTION OF THE DRAWINGS

FIG. 8 is a plan view of a pressure detector.

FIG. 9 is a cross sectional view of the integral part of the pressure detector as installed.

DETAILED DESCRIPTION OF THE PREFERRED EMBODIMENT

Figure 1:
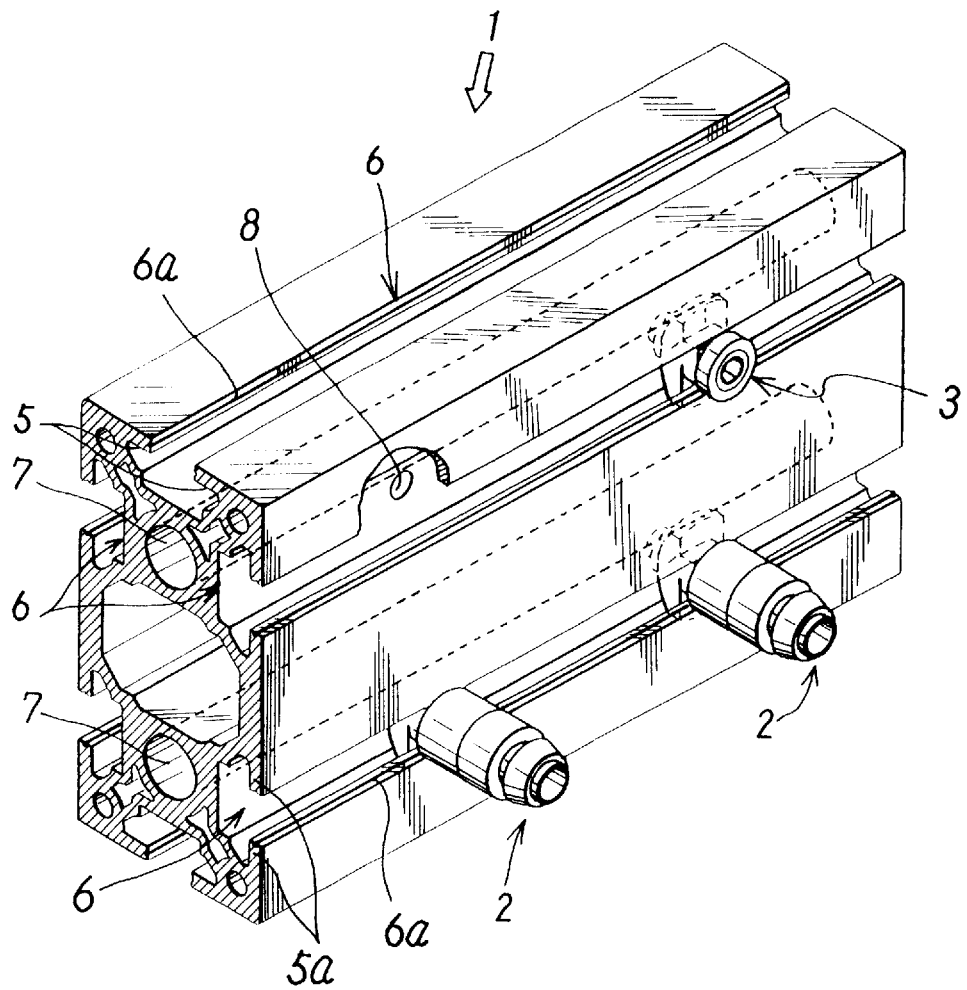
FIG. 1 is a perspective view of the integral part of an embodiment of this invention.

FIG. 1 shows the integral part of the first embodiment. Reference numeral 1 designates a frame member, 2 is a pipe joint fitted in a connection hole 8 in the frame member 1, and 3 is a plug that blocks the connection hole 8 while the pipe joint 2 is not fitted therein.

Figure 17:
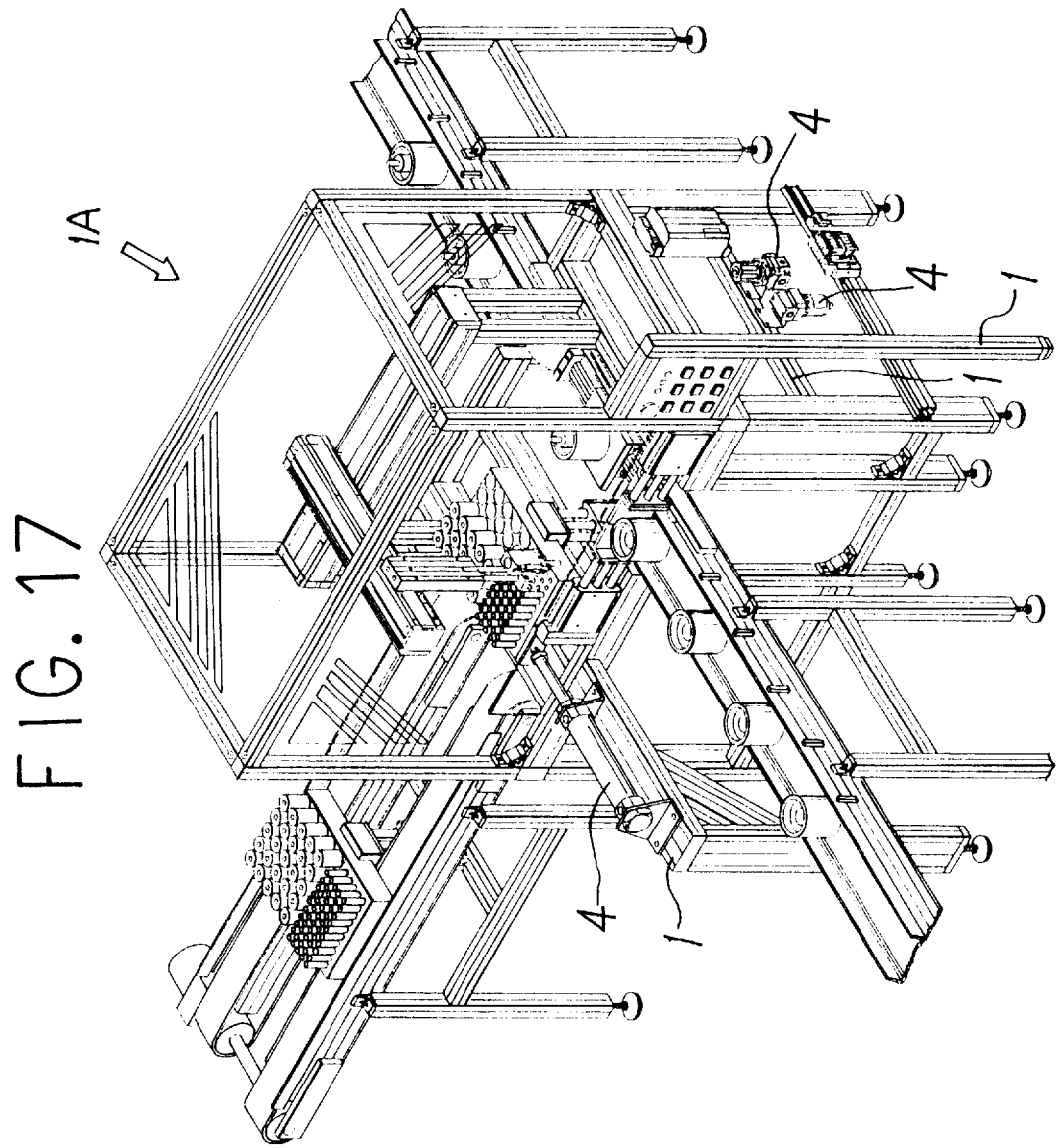
FIG. 17 is a perspective view of a structure.
Figure 18:
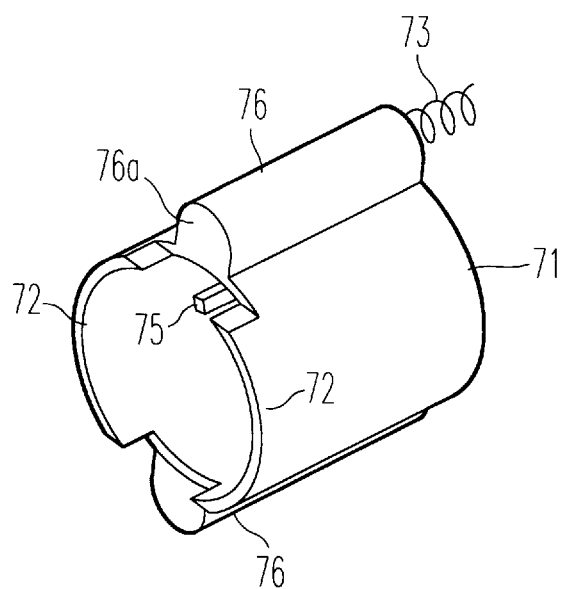
FIG. 18 is a perspective view of an outer casing of a lock means.

The frame member 1 connects to various fluid and electrical devices such as solenoid valves, cylinders, and their controllers, and also acts as a conduit for leading a pressurized fluid such as compressed air. For example, a plurality of frame members 1 are assembled together into a frame to form a structure 1A, the device 4 is attached to the structure, and a pressurized fluid is supplied to the device 4 through a tube connected to the pipe joint 2, as shown in FIG. 17.

The frame member 1 is a long member with a substantially rectangular cross section that is formed by extrusion-molding a raw material with the strength and rigidity required to form the structure 1A, for example, an aluminum alloy. The frame member has on each of its sides at least one fitting groove 6 used to install the device 4, or a fluid-related device such as a pipe joint 2 or a plug 3 to connect the frame members together. At least one fluid hole 7 for leading a pressurized fluid is formed in the frame member 1.

In the illustrated example, a single fitting groove 6 is formed in each of two narrow sides of the frame member 1, while two grooves are formed in each of two wide sides of the frame member 1. The number of fitting grooves 6, however, is not limited. The fitting groove 6 has an approximately T-shaped cross section in which the width of an opening 6a is smaller than that of the inside of the groove, and the pipe joint 2, plug 3, or device 4 is engaged with and attached to a pair of opening edges 5, 5 that extend inwardly in order to regulate the width of the opening 6a. A connection hole 8 leading to the fluid hole 7 is opened at an appropriate position in the bottom of the fitting groove 6, and the pipe joint 2 or plug 3 is fitted in the connection hole 8.

Figure 2:
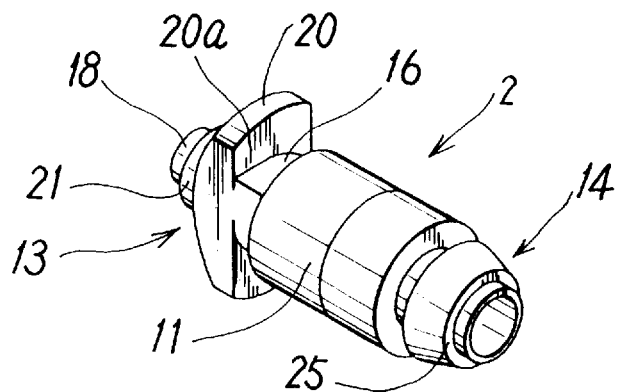
FIG. 2 is a perspective view of a pipe joint.
Figure 3:
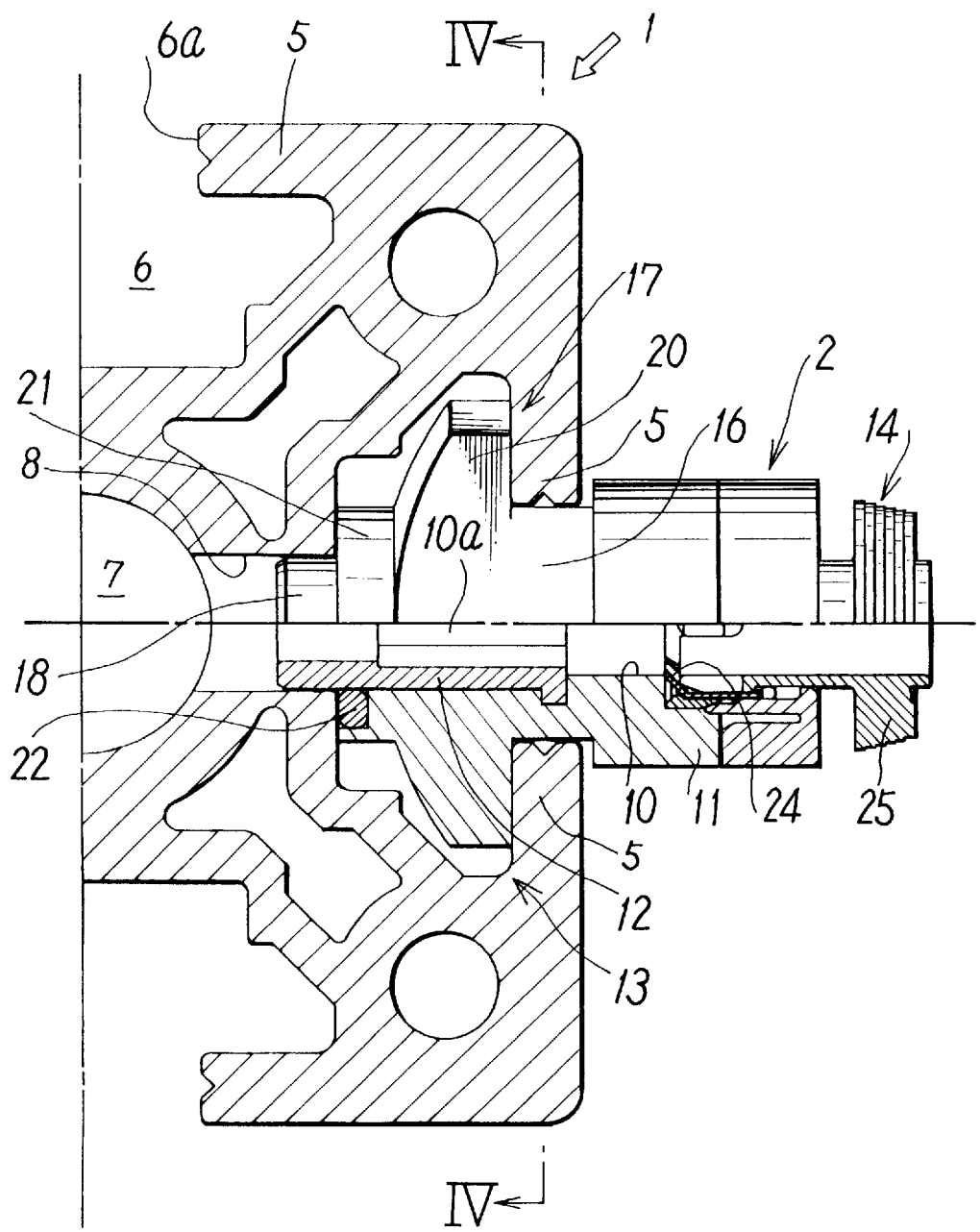
FIG. 3 is an enlarged cross sectional view of the pipe joint in FIG. 1 at its attached position.

As shown in FIGS. 2 and 3, the pipe joint 2 has at the proximal end of its first cylindrical body 11 of synthetic resin with a through hole 10 inside, an attachment section 13 that is attached to the frame member 1 and at an end of the first body 11 a tube connection 14 to which the tube is connected.

The attachment section 13 comprises a first portion 16 to be located between the pair of opening edges 5, 5 of the frame member 1, a second portion 17 to be located in the fitting groove 6, and a third portion 18 that is fitted in the connection hole 8.

The second portion 17 has a flange-like locking section 20 that contacts and engages the inner surfaces of the pair of opening edges 5, 5 in the fitting groove 6, a contacting section 21 that contacts the bottom of the fitting groove 6, and a seal member 22 that seals the circumference of the connection hole 8.

Figure 4:
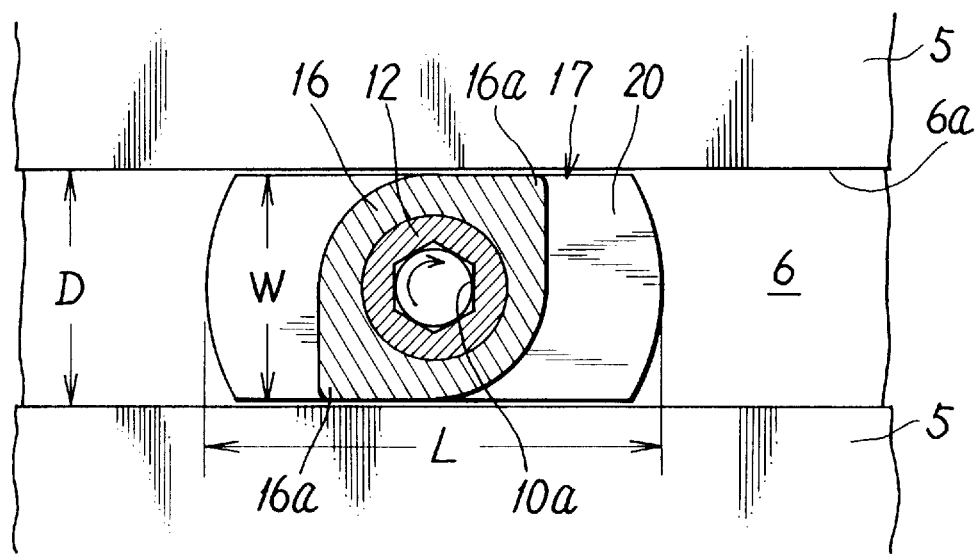
FIG. 4 is a cross sectional view showing the pipe joint before installation and taken at line IV—IV in FIG. 3.

The locking section 20 has a long shape as obtained by cutting a circle on two sides in parallel, and as shown in FIG. 4, its horizontal width W is slightly less than that D of the opening 6a of the fitting groove 6, while its length L is greater than the horizontal width D of the opening 6a. The contacting section 21 is cylindrical and has a diameter smaller than or equal to the horizontal width W of the locking section 20. The seal member 22 is mounted on the end of the contacting section 21 so as to surround the third portion 18.

The axial length of the second portion 17 is slightly less than or almost equal to the depth of the fitting groove 6. Thus, as shown in FIG. 4, by inserting the second portion 17 into the fitting groove 6 with the locking section 20 and the opening 6a aligned in parallel and rotating the pipe joint through 90° while pressing it hard toward the bottom of the groove to allow the locking section 20 to cross the opening 6a as shown in FIG. 5, the locking section 20 contacts and engages the inner surfaces of the pair of opening edges 5, 5 to fix the pipe joint 2, while the seal member 22 is simultaneously pressed against the bottom of the groove to seal the circumference of the connection hole 8.

The third portion 18 is fitted in the connection hole 8 to stabilize the installation of the pipe joint 2, and comprises an end of a second metallic and cylindrical body 12 in which a part of the through hole 10 is a hexagonal hole 10 a. The second body 12 is fitted and fixed inside the first body 11 with its end protruding outwardly. When the pipe joint 2 is attached to or removed from the frame member 1, a hexagonal spanner is inserted into the hexagonal hole 10a in the second body 12 to rotate the locking section 20.

Figure 5:
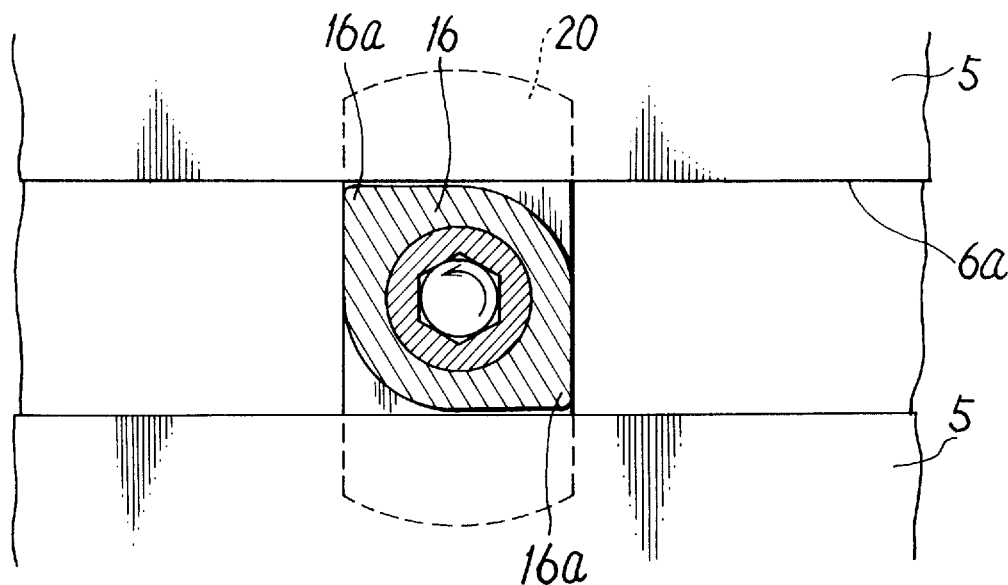
FIG. 5 is a cross sectional view showing the pipe joint after installation and taken at the same position as in FIG. 4.

The first portion 16 limits the rotation angle of the pipe joint 2 to 90° during the installation and removal of the pipe joint 2, and has a cross section as obtained by cutting off a diagonal pair of corners of a square arcuately, as seen in FIGS. 4 and 5. Thus, to install the pipe joint 2, the locking section 20 is inserted into the fitting groove 6 in parallel with the opening 6a as shown in FIG. 4, and the pipe joint 2 is then rotated through 90° clockwise, until the pair of corners 16a, 16a contact the pair of opening edges 5, 5 at the position shown in FIG. 5 and the pipe joint 2 is fixed. In addition, to remove the pipe joint 2, the pipe joint 2 is rotated 90° counterclockwise until the pair of corners 16a, 16a contact opposite opening edges 5, 5 at the position in FIG. 4 where the locking section 20 is again located in parallel with the fitting groove 6. The pipe joint can then be removed from the fitting groove 6.

The tube connection 14 is provided at the end of the pipe joint 2, so that a tube is inserted into the hole at its end. The tube connection 14 according to this embodiment is shown to have a publicly known instant connection mechanism with which, when the tube is inserted, a claw 24 is engaged with the outer surface of the tube to lock it, whereas when a releasing bush 25 is pushed in, the claw 24 is disengaged to release the tube. The configuration of the tube connection section 14, however, is not limited to this aspect, and screws or other means may be used to connect the tube.

The pipe joint 2 can be easily attached to and removed from the frame member 1 by inserting the attachment section 13 into the fitting groove 6 and rotating it 90° clockwise or counterclockwise. The installation and removal of the pipe joint 2 is very simple and quick compared to conventional methods using screws. Since the device-fitting groove 6 can also be used to install the pipe joint 2, special machining such as the machining of the connection holes 8 into screw holes and the cutting of a plurality of threads is not required, the frame member 1 can be machined easily, and the number of required parts is small.

In addition, by connecting a tube to the pipe joint 2 attached to the frame member 1, a pressurized fluid such as compressed air can be supplied to the device 4 from the frame member 1 via the tube and removed therefrom.

Figure 6:
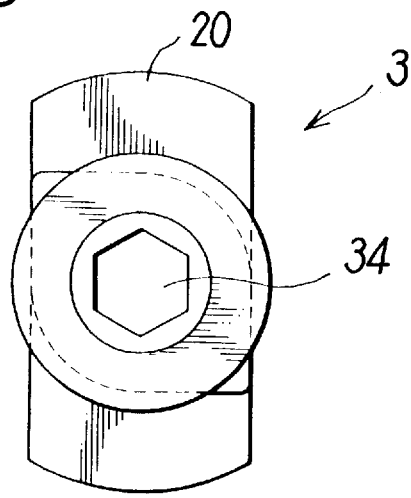
FIG. 6 is a front view of the plug.
Figure 7:
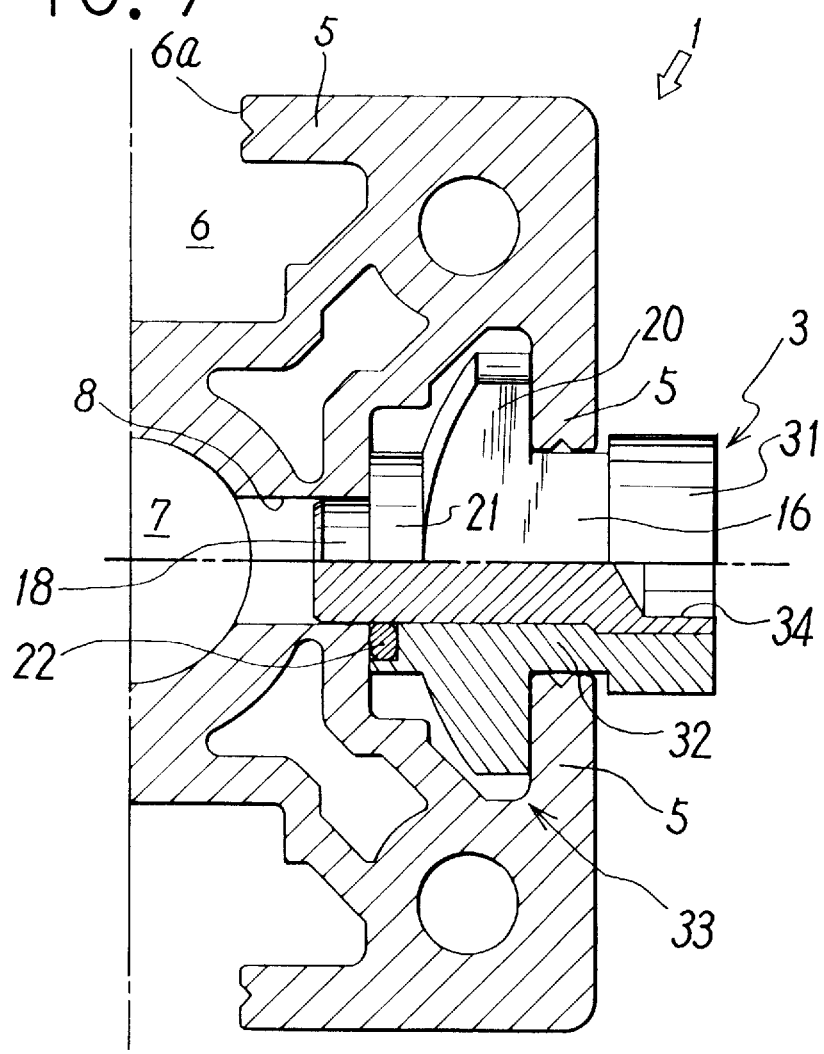
FIG. 7 is an enlarged cross sectional view of the plug in FIG. 1 at its attached position.

FIGS. 6 and 7 specifically show the configuration of the plug 3 that blocks an unused connection hole 8. The plug 3 comprises a first body 31 of synthetic resin and a second metallic body 32 fitted inside the first body 31, and the first and second bodies constitute an attachment section 33. The constitution of the attachment section 33 is substantially the same as that of the attachment section 13 of the pipe joint 2 described earlier, so these components have been given the same reference numerals as in attachment section 13 of the pipe joint 2 and their description has been omitted.

The second body 32 is a cylindrical member without a through hole, and has at its head a hexagonal hole 34 into which a hexagonal spanner is inserted and rotated through 90° to attach and remove the plug 3 to and from the frame member 1.

Thus, if the pipe joint 2 is removed or its attached position is changed to remove the device 4 or to change its attached position, its removal and installation can be carried out simply and quickly by removing the plug 3 from the connection hole 8 or inserting it into the specified connection hole 8 in the same manner as in the above case of the pipe joint 2.

FIGS. 8 and 9 shows as another example of a fluid-related device a pressure detector 40 for detecting fluid pressure in the fluid hole 7, although it is not shown in FIG. 1.

The pressure detector 40 comprises a first body 41 of synthetic resin, a second cylindrical metallic body 42 fitted and fixed inside the first body 41, a cover 44 screwed on the outer end of the second body 42, a pressure indicator 46 that is hermetically inserted and axially slidable in an enlarged diameter portion of a through hole 45 of the second body 42, and a spring 47 compressed between the cover 44 and the pressure indicator 46. The first body 41 and second body 42 constitute an attachment section 43 that is attached to the frame member 1. The constitution of the attachment section 43 is substantially the same as that of the attachment section 13 of the pipe joint 2, so these components have been given the same reference numerals as in attachment section 13 of the pipe joint 2 and their description has been omitted.

The proximal end of the pressure indicator 46 contacts a stage portion of the through hole 45 due to the force applied by the spring 47. In this state, a display section 46a at the end is inserted into a central hole 44a in the cover 44 and is flush with the surface of the cover 44.

The pressure detector 40 is attached to the opening position of the connection hole 8 in the fitting groove 6 using the attachment section 43 in the same way as the pipe joint 2. The seal member 22 then seals the circumference of the connection hole 8.

When a pressurized fluid is supplied to the fluid hole 7 in the frame member 1, it acts on the pressure indicator 46 through the through hole 45. The pressure indicator 46 then slides against the force applied by the spring 47, and the end of the display section 46a protrudes from the surface of the cover 44.

The pressure detector 40 can thus be used to determine whether or not a specified amount of fluid pressure is acting on the fluid hole 7. The magnitude of fluid pressure can be coped with by adjusting the force applied by the spring 47.

Figure 10:
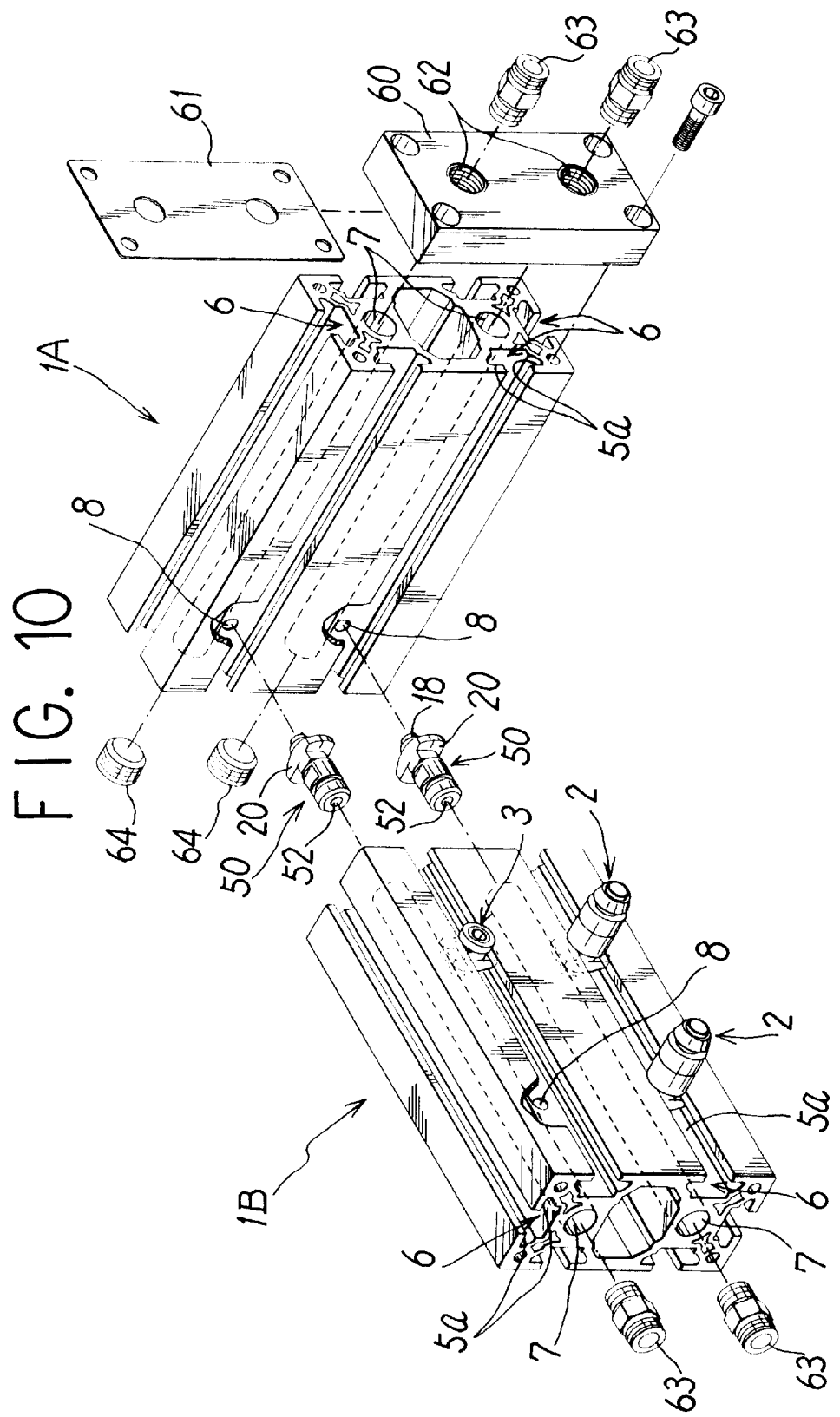
FIG. 10 is a perspective view of the integral part of another embodiment of this invention.

FIG. 10 shows another embodiment of this invention. This figure shows as a fluid-related device a fluid hole joint 50 used to connect together the fluid holes 7, 7 in the two frame members 1A, 1B shown in FIG. 1 when the frame members are substantially connected at a right angle.

Figure 11:
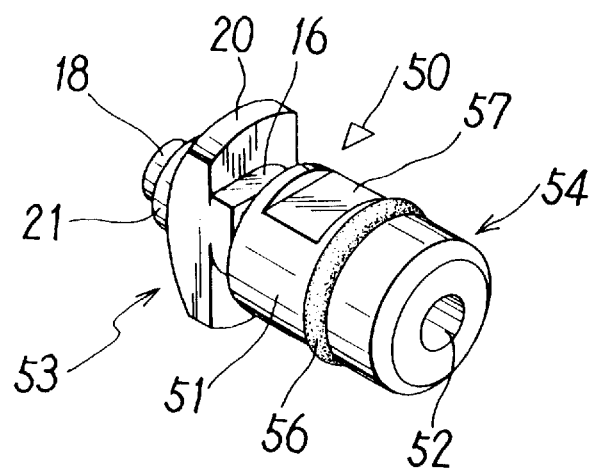
FIG. 11 is a perspective view of a fluid hole joint.
Figure 12:
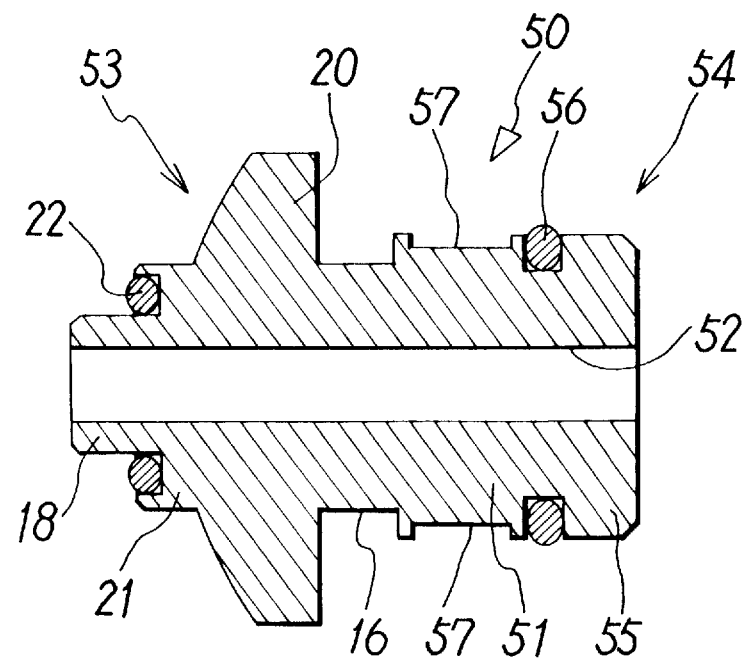
FIG. 12 is a cross sectional view of the fluid hole joint shown in FIG. 11.

As seen in FIGS. 11 and 12, the fluid hole joint 50 has at the proximal end of its body 51 of metal or synthetic resin with an axially penetrating through hole 52, a first attachment section 53 that is attached to the opening position of the connection hole 8 in the fitting groove 6 in the first frame member 1A and at the other end of the body 51 a second attachment section 54 that is connected to the end of the fluid hole 7 in the second frame member 1B.

The constitution of the first attachment section 53 is substantially the same as that of the attachment section 13 of the pipe joint 2, so these components have been given the same reference numerals as in attachment section 13 of the pipe joint 2 and their description has been omitted.

The second attachment section 54 includes a seal member 56 that is pressed against the inner surface of the fluid hole 7, on the outer circumference of a cylindrical insertion section 55 that is inserted into the fluid hole 7 in the second frame member 1B.

A planar portion 57 on which a tool such as a wrench is placed is formed on the outer surface of the body 51, and the tool placed on this portion can be used to rotate the fluid hole joint 50.

The fluid hole joint 50 can thus reliably connect the fluid holes 7, 7 in the two frame members 1A, 1B using a simple operation when the end of the second frame member 1B is contacted with the side of the first frame member 1A so as to substantially connect the frame members 1A, 1B together at a right angle.

Reference numeral 60 in FIG. 10 indicates an adapter plate that is attached to the end of a frame member via a gasket 61 and which has a screw-hole-type port 62 in communication with the fluid hole 7. A normal pipe joint 63 is screwed into the port 62, and a tube is connected to the pipe Joint 63. Thus, this adapter plate 60 is used when a tube is connected to the end of the fluid hole 7 in the frame member and when the pipe joint 63 cannot be screwed into the frame member due to the absence of a thread at the end of the fluid hole 7.

If the end of the fluid hole 7 is threaded as typically shown by the frame member 1B, the pipe joint 63 can be directly screwed.

Reference numeral 64 denotes a plug that blocks the end of the fluid hole 7 in the frame member that is not required to be connected to another frame member.

Figure 13:
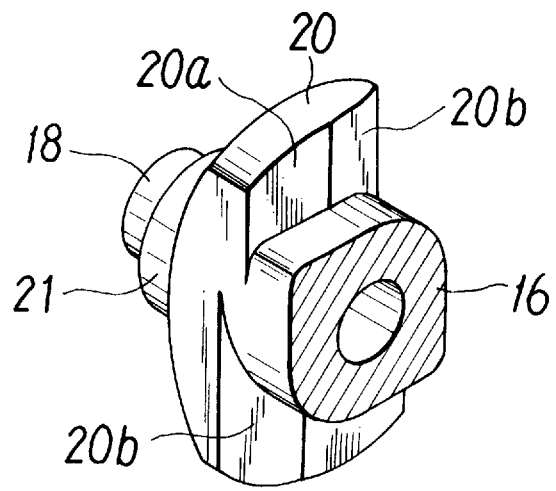
FIG. 13 is a perspective view of the integral part of another example of the configuration of an attachment section of a fluid-related device.

FIG. 13, shows a preferred embodiment of an attachment section of a fluid-related device. According to each of the above embodiments as typically shown by the pipe joint 2 in FIG. 2, the surface 20a of the locking section 20 of the fluid-related device that contacts the opening edges of the fitting groove is generally formed as a plane, but in FIG. 13, one half of the contacting surface 20a in its horizontal width direction (that is, the portion that initiates engagement with the opening edges 5, 5 due to rotation) is formed like an arc or cut diagonally so as to constitute an inclined portion 20b that gradually inclines outward from the opening edges. This constitution of the contacting surface 20a prevents its end from being caught by the opening edges 5, 5 and hampering rotation when the fluid-related device is rotated from the position in FIG. 4 to where the locking section 20 is fully contacted and engaged with the inner surface of the opening edges 5, 5. Thus, the attachment section of the fluid-related device according to each of the above embodiments is desirably configured as shown in FIG. 13.

The inclined portion 20b may be both halves of the contacting surface 20a in its horizontal width direction.

FIGS. 14 to 16 and 18 show yet another embodiment of this invention. These figures show as one example of the fluid-related device a pipe joint 60 including a lock means 70 for keeping the device attached to the frame member. The constitution of the attachment section 63 of the pipe joint 60 is substantially the same as that of the attachment section 13 of the pipe joint 2 in FIG. 2, so these components have been given the same reference numerals as in attachment section 13 of the pipe joint 2, and their description has been omitted.

The lock means 70 comprises an outer casing 71 mounted on the outer circumference of an end of the body 61 of the pipe joint 60, a pair of protrusions 72, 72 formed at opposite positions at the proximal end of the outer casing 71 so as to protrude axially and having an exact width that enables the protrusion to be fitted in the opening 6a of the fitting groove 6 in the frame member 1, and a spring 73 compressed between the body 61 and the outer casing 71 for pressing the outer casing 71 toward its proximal end. Due to the combination of a groove 74 and a protrusion 75 formed in the outer casing 71 and the body 61, respectively, the outer casing 71 can be axially moved a specified distance, but is fixed in the rotational direction. The outer casing 71 of the lock means 70 is shown by itself in FIG. 18.

The spring 73 is accommodated in spring chambers 76, 76 that protrude transversely from the outer casing 71 and the body 61 in the same circumferential position as the locking section 20. The spring chamber 76 also acts as a mark to confirm that the locking section 20 is correctly engaged with the opening edges 5, 5.

Figure 16:
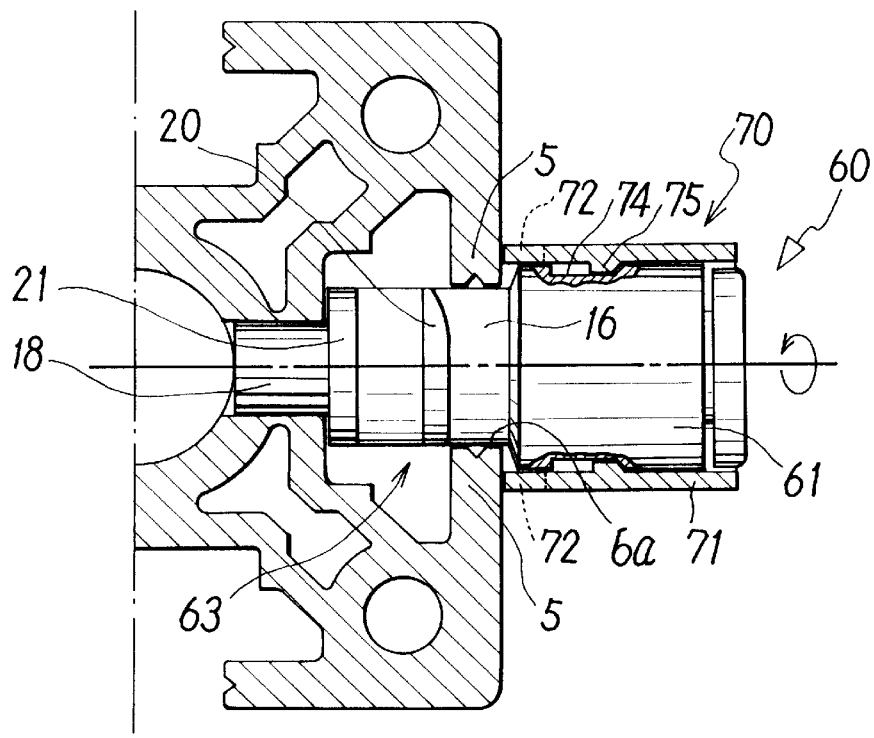
FIG. 16 is a cross sectional view showing a method for mounting a pipe joint.

To install the pipe Joint 60, the locking section 20 is inserted into the fitting groove 6 in parallel with the opening 6a with a hexagonal bar spanner for rotational operations (not shown) inserted into the pipe Joint 60, as shown in FIG. 16. The pair of protrusions 72, 72 then contact the outer surfaces of the upper and lower opening edges 5, 5, and the outer casing 71 compresses the spring 73 to move toward the end of the body 61.

Figure 14:
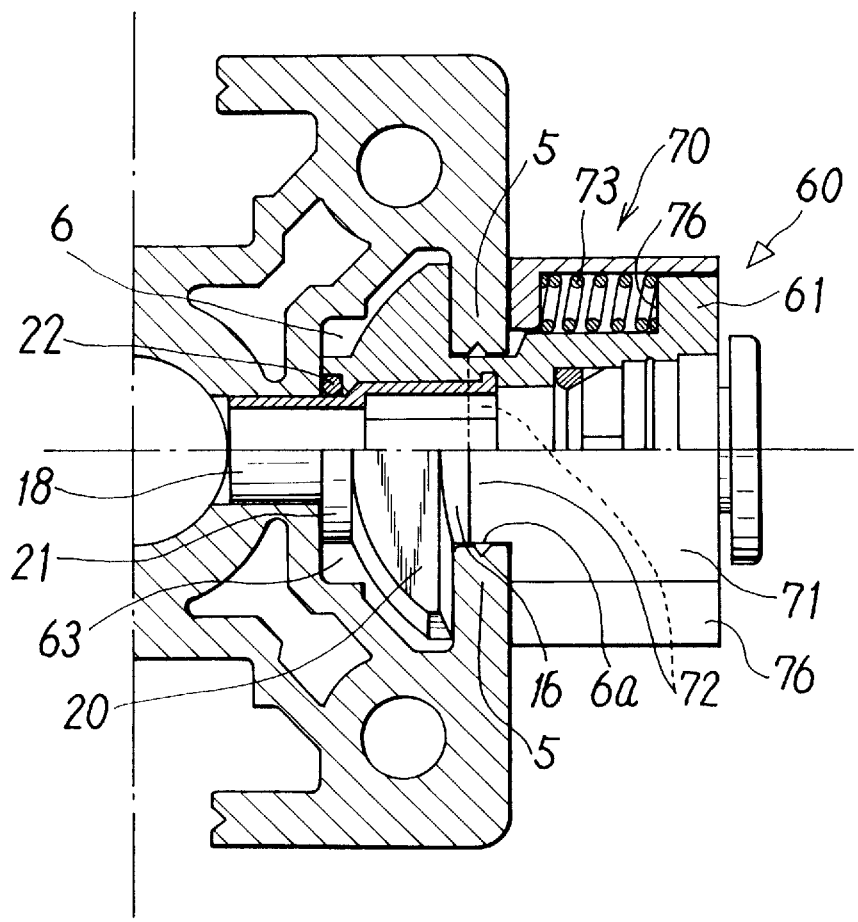
FIG. 14 is a cross sectional view of the integral part of yet another embodiment of this invention.
Figure 15:
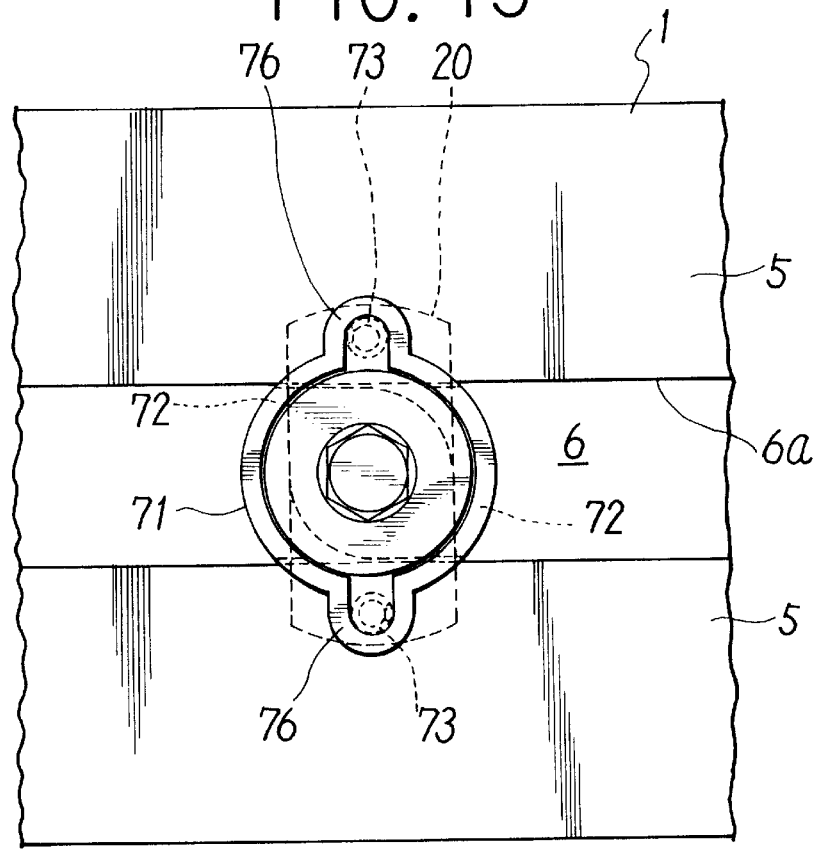
FIG. 15 is a front view of FIG. 14.

Next, when the hexagonal bar spanner is used to rotate the pipe joint 60 through 90° in the direction shown by the arrow, the locking section 20 crosses the opening 6a to contact and engage the inner surface of the opening edges 5, 5 in order to Fix the pipe joint 60, as shown in FIGS. 14 and 15. In this case, the protrusions 72, 72 also rotate 90° to move to the exact position of the opening 6a, so the axial movement of the outer casing 71 pressed by the spring 73 causes the protrusion to be fitted in the opening 6a and the pipe joint 60 to be locked in its rotation position.

This prevents the pipe joint 60 from being gradually rotated by vibrations or impact and finally falling from the frame member.

To remove the pipe joint 60, the outer casing 71 is pulled toward the end of the body 61 to withdraw the protrusions 72, 72 from the opening 6a of the fitting groove 6, and the pipe joint 60 is then rotated through 90°. The locking section 20 is then located in parallel with the opening 6a, as shown in FIG. 16, so the pipe joint 60 can be removed from the frame member 1.

Although in the above embodiment, the pipe joint 60 includes the lock means, such a lock can of course be provided in other fluid-related devices such as a plug or pressure detector.

As described above, this invention can use device-fitting grooves to simply and quickly attach and remove a fluid-related device such as a Joint, a plug, or a pressure detector to and from the frame member acting as both an attachment member to which various fluid or electrical devices can be attached and as a conduit.

This invention can also reliably attach a fluid-related device to a frame member so that the device will not be removed by vibrations or impact.

What is claimed is:

1. A mechanism for attaching a fluid-related device to a frame member that has, on at least one of its sides, at least one fitting groove in which various fluid and electrical devices can be attached, and at least one fluid hole inside for leading a pressurized fluid, wherein:

the at least one fitting groove in said frame member has an approximately T-shaped cross section with the width of its opening reduced by a pair of opening edges and inner surfaces thereon extending inwardly and a connection hole leading to said at least one fluid hole, and wherein:

an attachment section of said fluid-related device attachable to the frame member at the positions of said at least one connection hole has:
   a first portion locatable between the pair of opening edges of said at least one fitting groove and configured to cooperate with the opening edges to permit and regulate rotation so as to limit the rotation angle of the fluid-related device to 90° when the first portion is located between the pair of opening edges;
   a second portion having a locking section that has a horizontal width less than the width of the opening of said at least one fitting groove and a length greater than the same width of the opening and which engages the inner surfaces of the opening edges when inserted into said at least one fitting groove and rotated through 90° and a seal member that is pressed against a bottom of the at least one fitting groove to seal the circumference of the connection hole when the locking section is engaged with the opening edges; and
   a third cylindrical portion that is fitable in said connection hole.

2. An attachment mechanism according to claim 1 wherein the locking section of said at least one fluid-related device has on at least half of that surface in its horizontal width direction that contacts the inner surfaces of the opening edges of said fitting groove, a portion that gradually inclines outward away from the opening edges.

3. An attachment mechanism according to claim 1 wherein the fluid-related device has a lock means for locking the device attached to the frame member.

4. An attachment mechanism according to claim 3 wherein the lock means comprises an outer casing mounted on the outer circumference of the body of said fluid-related device in such a way that the casing can move in the direction of the axis of the body but is fixed in its rotational direction, at least one protrusion formed at the end of the outer casing and having an exact width that enables the protrusion to be fitted in the opening of said at least one fitting groove, and a spring for pressing said outer casing in the direction in which the protrusion is fitted in the opening.

* * * * *